US008356002B2

(12) United States Patent  (10) Patent No.: US 8,356,002 B2
Kim et al.  (45) Date of Patent: Jan. 15, 2013

(54) LEARNING APPARATUS AND METHOD OF INTELLIGENT SYSTEM

(75) Inventors: Rockwon Kim, Daejeon (KR); Aekyeung Moon, Daejeon (KR); Taegun Kang, Daejeon (KR); Hyoungsun Kim, Daejeon (KR); Hyunkyu Cho, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 1276 days.

(21) Appl. No.: 12/123,039

(22) Filed: May 19, 2008

(65) Prior Publication Data

US 2009/0063388 A1  Mar. 5, 2009

(30) Foreign Application Priority Data

Sep. 4, 2007  (KR) .......................... 10-2007-0089435

(51) Int. Cl.
 *G06F 17/00* (2006.01)
(52) U.S. Cl. ............ 706/47; 704/231; 704/251; 704/275
(58) Field of Classification Search .................... 706/47; 704/275
See application file for complete search history.

(56) References Cited

U.S. PATENT DOCUMENTS

| | | | | |
|---|---|---|---|---|
| 6,038,556 | A * | 3/2000 | Hutchison | 706/25 |
| 6,233,545 | B1 * | 5/2001 | Datig | 704/2 |
| 6,754,644 | B1 * | 6/2004 | Hutchison | 706/20 |
| 6,850,252 | B1 * | 2/2005 | Hoffberg | 715/716 |
| 8,046,322 | B2 * | 10/2011 | Wang et al. | 706/48 |
| 8,204,751 | B1 * | 6/2012 | Di Fabbrizio et al. | 704/275 |
| 2003/0101152 | A1 * | 5/2003 | Hicks | 706/45 |
| 2006/0033625 | A1 * | 2/2006 | Johnson et al. | 340/573.1 |
| 2006/0247915 | A1 * | 11/2006 | Bradford et al. | 704/1 |
| 2007/0015494 | A1 * | 1/2007 | Sinclair et al. | 455/414.1 |
| 2007/0112824 | A1 * | 5/2007 | Lock et al. | 707/102 |
| 2008/0114710 | A1 * | 5/2008 | Pucher | 706/20 |
| 2009/0063388 | A1 * | 3/2009 | Kim et al. | 706/50 |

FOREIGN PATENT DOCUMENTS

| | | |
|---|---|---|
| JP | 2002-307349 | 10/2002 |
| JP | 2003-22131 | 1/2003 |
| KR | 10-2005-0118822 | 12/2005 |
| KR | 10-2006-0087132 | 8/2006 |

* cited by examiner

*Primary Examiner* — Alan Chen
*Assistant Examiner* — David H Kim
(74) *Attorney, Agent, or Firm* — Staas & Halsey LLP

(57) ABSTRACT

A learning apparatus and method of an intelligent system according to the present invention relates to learning of an intelligent system that automatically controls a system on the basis of information about events generated in an external environment or services input by a user. In the learning, it is determined whether rules extracted from event data or service data are the same as rules already stored. Then, if it is determined that the rules are new rules, queries about the confidence of new rules are generated and provided to a user. The rules are updated on the basis of user's answers. Accordingly, it is possible to accurately grasp users' patterns by using very small amount of observation data as compared to an existing method, and to more easily sense variable patterns. Therefore, it is possible to obtain a more intelligent learning in the intelligent system.

9 Claims, 4 Drawing Sheets

FIG.3

| | EVENT PREDICATE (T110) | EVENT FUNCTION (T120) | EVENT VALUE (T130) | EVENT TEXT (T140) |
|---|---|---|---|---|
| 1 | location | N/A | 'MAIN ROOM' | IN 'MAIN ROOM' |
| 2 | = | time | '9:00 AM' | AT '9 A.M.' |
| 3 | user | N/A | 'CHUL-SOO' | 'CHUL-SOO' IS··· |
| 4 | > | temp | 30 | IF TEMPERATURE IS LOWER 'THAN 30' |
| 5 | sofa | N/A | on | SEATED IN SOFA |
| 6 | | | | |
| 7 | | | | |

FIG.4

| | SERVICE PREDICATE (T210) | SERVICE STATE (T220) | SERVICE VALUE (T230) | SERVICE TEXT (T240) |
|---|---|---|---|---|
| 1 | Mail | on | | CONFIRM MAIL. |
| 2 | Music | on | 'Yesterday' | LISTEN TO 'Yesterday'. |
| 3 | News | on | 'ECONOMY' | LISTEN TO 'ECONOMY NEWS'. |
| 4 | Light | on | 20 | SET LIGHT TO '20' LEVELS OF BRIGHTNESS. |
| 5 | Window | on | | OPEN WINDOW. |
| 6 | AirConditioner | on | | AIR CONDITIONER IS TURNED ON. |
| 7 | | | | |

FIG.5 hour()≤18,User(X), Action(X, "light4"), value("light4")≤12 → Action(X, "MSMedia", "off").
IF BRIGHTNESS OF LIGHT4 IS SMALLER THAN 12 BEFORE 6 P.M., MSMedia IS NOT USED.

hour()≤18, Action(X, "light4"), value("light4")>12, Action(X, "MSWord"), Off(X, "MSWord") → Action(X, "MSMedia", "on").
IF BRIGHTNESS OF LIGHT4 IS LARGER THAN 12 BEFORE 6 P.M. AND MSWord IS NOT USED, MSMedia IS USED.

hour()≤18, Action(X, "light4"), value("light4")>12, Action(X, "MSWord"), On(X, "MSWord") → Action(X, "MSMedia", "off").
IF BRIGHTNESS OF LIGHT4 IS LARGER THAN 12 BEFORE 6 P.M. AND MSWord IS USED, MSMedia IS NOT USED.

hour()>18, Action(X, "MSWord"), Off(X, "MSWord") → Action(X, "MSMedia", "on").
IF MSWord IS NOT USED AFTER 6 P.M., MSMedia IS USED.

hour()>18, Action(X, "MSWord"), On(X, "MSWord") → Action(X, "MSMedia", "off").
IF MSWord IS USED AFTER 6 P.M., MSMedia IS NOT USED.

LEARNING APPARATUS AND METHOD OF INTELLIGENT SYSTEM

CROSS-REFERENCE TO RELATED APPLICATIONS

This application is based upon and claims the benefit of priority from prior Korean Patent Application No. 10-2007-0089435 filed on Sep. 4, 2007, the entire contents of which are incorporated herein by reference.

BACKGROUND OF THE INVENTION

1. Field of the Invention

The present invention relates to a learning apparatus and method of an intelligent system, and more particularly, to a learning apparatus and method of an intelligent system that allows a user to automatically control a system on the basis of information about events generated in an external environment, such as a mobile robot or a sensor network, or services input by a user.

2. Description of the Related Art

As a robot or ubiquitous technology has been researched in recently years, there has been actively researched a study that previously expects a certain situation on the basis of data obtained from robots or sensors and makes a machine autonomously perform an appropriate work.

Various machine learning algorithms, such as a decision tree, a neural network, and a bayesian network, are used to perform autonomous learning. Meanwhile, it is possible to expect a certain situation by using learning results obtained from the algorithms. In this case, if the amount of data is very large or attributes included in the data do not include a large amount of errors, it is possible to expect a certain situation by using the only learning results. However, there is a problem in that it is difficult to expect a certain situation by using the above-mentioned method when the amount of data is small or a solution is not definite and variable.

SUMMARY OF THE INVENTION

The present invention has been made to solve the above-mentioned problem, and an object of the present invention is to provide a learning apparatus and method of an intelligent system that obtain accurate user rules through user identification whenever a small amount of sensing data or newly sensed information is generated.

Another object of the present invention is to provide a learning apparatus and method of an intelligent system that can quickly learn various users' patterns.

According to an aspect of the present invention, a learning apparatus of an intelligent system automatically controls a system on the basis of information about events generated in an external environment or services input by a user. The learning apparatus includes a rule management device. The rule management device determines whether rules extracted from event data or service data are the same as rules already stored, generates queries about the confidence of new rules and provides the queries to a user if the rules are the new rules, and updates the rules on the basis of user's answers.

The rule management unit may includes a translation table used to translate services and events, which are included in rules extracted from a learning engine, into strings; a query generation module that generates user queries by using the translation table; a speech module that delivers the user queries to a user by TTS (Text to Speech); and a response recognition module that receives answers from the user.

The learning apparatus of the intelligent system may further include a rule storage device that stores the rules in a confidence region or a non-confidence region depending on the confidence of rules input by the user. Further, the learning apparatus of the intelligent system may further include a rule engine that processes logical conclusion and queries about the stored rules; and a rule trigger that searches services corresponding to event or service information that is currently input from rules already stored, and provides corresponding services or related services to the user.

The learning apparatus of the intelligent system may further include a logging device that stores sensed event information or log information about service requests; an event analyzing device that analyzes event or service information input from the logging device, classifies the event or service information into data to be learned, and preprocesses the data; a learning engine that implements a learning algorithm by using the data preprocessed in the event analyzing device so as to search users' patterns included in the preprocessed data; and a rule extracting device that converts the results searched by the learning engine into rule formats, and extracts rules.

The event analyzing device may includes a table that stores meta information about an event source or meta information about services implemented by a service terminal, and a log binding unit that searches service information related to event information and relates service information to event information.

According to another aspect of the present invention, a learning method of an intelligent system automatically controls a system on the basis of information about events generated in an external environment or services input by a user. The learning method includes determining whether rules extracted from event data or service data are the same as rules already stored, generating queries about the confidence of new rules and providing the queries to a user if the rules are the new rules, and updating the rules on the basis of user's answers.

According to the present invention, since rules generated through learning by using user identification are confirmed, it is possible to accurately grasp users' patterns by using very small amount of observation data as compared to an existing method. Further, human's patterns are generally changed with time. In this case, it is possible to obtain a more intelligent learning in various fields, such as a mobile phone, a toy, a robot, and a software agent, by easily sensing this change and confirming the change through queries about a user.

BRIEF DESCRIPTION OF THE DRAWINGS

FIG. 3 is a view showing an example of a table that is used to translate events included in a rule according to the present invention into user queries;

FIG. 4 is a view showing an example of a table that is used to translate services included in a rule according to the present invention into user queries; and FIG. 5 is a view showing an example of user queries for a rule that is used in a learning apparatus and a learning method according to the present invention.

DESCRIPTION OF THE PREFERRED EMBODIMENTS

A preferred embodiment of the present invention will be described below with reference to drawings.

Figure 1:
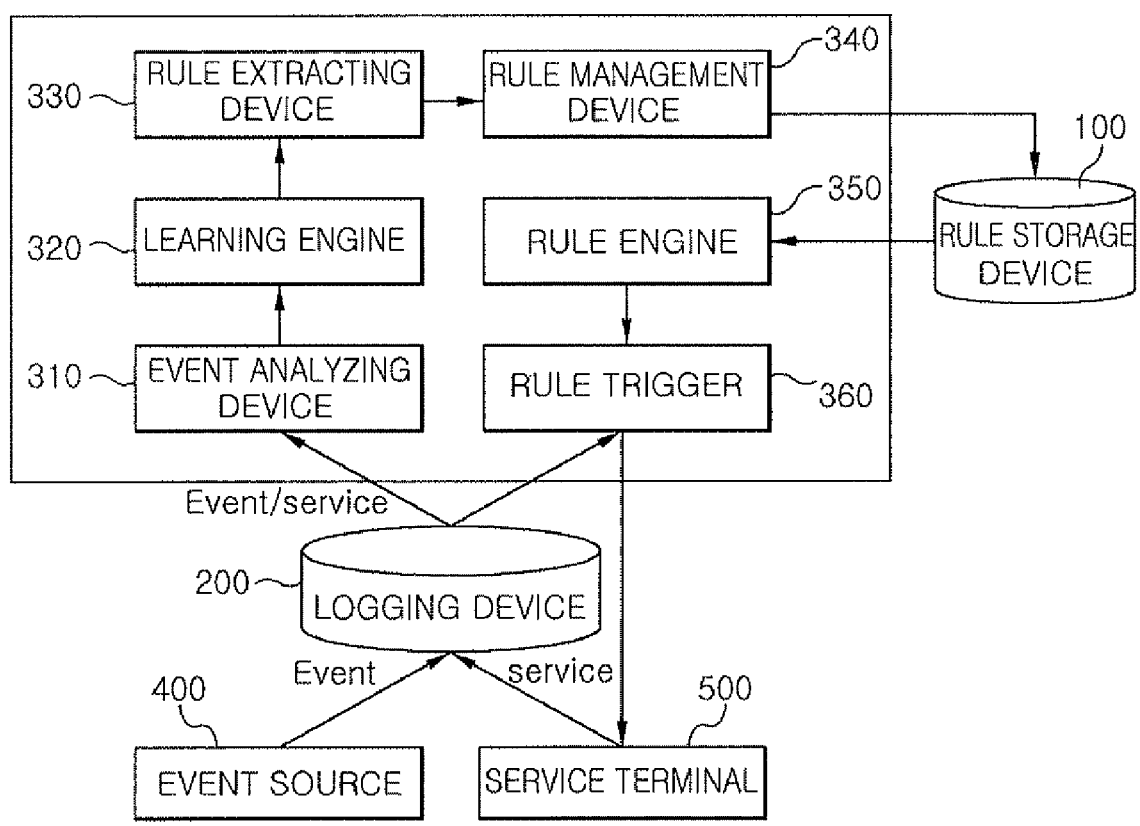
FIG. 1 is a block diagram of a learning apparatus of an intelligent system according to the present invention.

FIG. 1 is a block diagram of a learning apparatus of an intelligent system according to the present invention.

An intelligent system to which the present invention is applied may include an event source 400 that has the form of a robot or a sensor, a service terminal 500, a logging device 200, an event analyzing device 310, a learning engine 320, a rule extracting device 330, a rule-related device 340, a rule engine 350, a rule trigger 360, and a rule storage device 100.

The event source 400 receives information, which is generated from user's actions, from sensors or robots provided in specific environments. Examples of the kind of a sensor to be used as the event source 400 and recognition information of the robot may correspond to time, user recognition, a user's position, internal/external temperature, humidity, weather, internal/external illuminance, and the pressure of a sofa/bed.

The service terminal 500 is a service providing device or a terminal that may be provided to a user in an environment where a system is implemented. In this case, the terminal means a terminal device that can obtain services provided from an Internet or a learning server. Examples of the service terminal 500 may include a device including an input terminal, which is used to control parameters about a mail confirmation service, music/TV recommendation, illumination, heating, and an air conditioner.

The logging device 200 is a device that stores sensing information input from the event source 400 and meta information about services implemented in the service terminal 500. History of event and service information are required to allow the learning engine to learn what kind of service a user use in what kind of situation. Further, if the services to be used are complex services, the learning engine needs to know contexts between the services.

The event analyzing device 310 searches services related to the events with respect to input event/service groups, and converts the searched events into data formats that can be processed by the learning engine 320. Then, the event analyzing device outputs the data, which is to be learned, to the learning engine 320. That is, the event analyzing device analyzes logged event/service information, classifies the logged event/service information into data to be learned, and preprocesses the data.

The event analyzing device 310 may include a table that stores meta information about the event source or meta information about the services implemented by the service terminal, a log binding module that searches service information related to the event information and relates the service information to the event information, and an interface that inputs log binding data to the learning engine for every time unit. Events, which are not objects to be learned, may exist in the events. These events are filtered by the event analyzing device 310.

The learning engine 320 implements a learning algorithm by using data input from the event analyzing device 310 so as to search users' patterns included in the input data. The searching the users' patterns is performed with respect to the services supported by the service terminal 500.

The rule extracting device 330 converts the result, which is obtained from the learning engine 320, into a rule format that can be used in a rule-based system. The result obtained from the learning engine 320 is represented in various formats by a learning algorithm, such as a decision tree, a fuzzy rule, and a neural network.

The rule management device 340 manages rules that are obtained by the rule extracting device 330. When newly obtained rules conflict with existing rules or when the obtained rules are very ambiguous, the rule management device asks a user questions and newly arranges rules on the basis of the user's answers.

The rule management device may include a translation table, a query generation module, a speech module, a response recognition module, and a rule classification module. The translation table is used to translate services and events, which are included in the rules extracted from the learning engine, into strings. The query generation module generates user queries by using the translation table. The speech module delivers the user queries to the user. The response recognition module receives answers from the user. The rule classification module stores the rules in the rule storage device on the basis of the recognized answers.

The rule storage device 100 stores the rules and a knowledge base, and provides a storage media that can be searched. The rules are classified and then stored in a confidence region and a non-confidence region.

The rule engine 350 processes logical conclusion and queries about the stored rules. That is, the rule engine is used to ask queries about the stored rules or to obtain rules that can be newly induced.

The rule trigger 360 searches services corresponding to event or service information that is currently input with respect to the rules obtained from the conversation between the learning and a user, and provides corresponding services or related services to the user.

Figure 2:
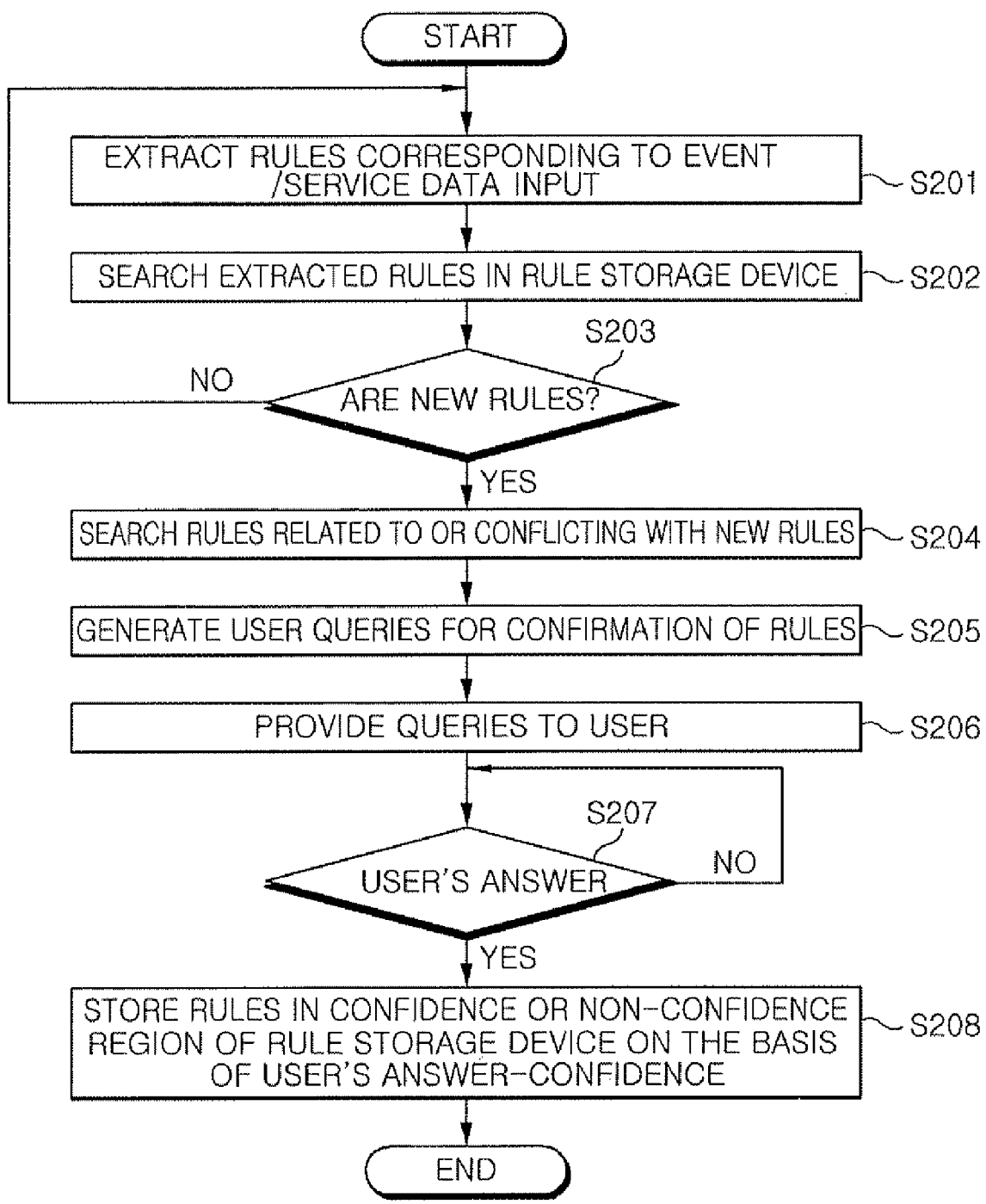
FIG. 2 is a flowchart illustrating a rule management method according to a preferred embodiment of the present invention.

FIG. 2 is a flowchart illustrating a rule management method according to a preferred embodiment of the present invention.

First, event or service data, which are input from the event source 400 or the service terminal 500 through the logging device 200, are converted while passing through the event analyzing device 310, the learning engine 320, and the rule extracting device 330. Then, the event or service data are extracted in the form of corresponding rules (S201).

When the rules are extracted, it is searched whether the rules are stored in the rule storage device 100 (S202), and it is determined whether the rules are the same as the rules already stored in the rule storage device 100 or new rules (S203). If the rules are not new rules but the existing rules (No in S203), the procedure does not proceed with respect to the rules, returns to Step S201, and proceeds with respect to next event or service data. However, if the rules are new rules (Yes in S203), rules related to or conflicting with the new rules are searched in the rule storage device 100 (S204) and queries to be asked are generated in consideration of the rules related to or conflicting with the new rules (S205). The generated queries are provided to a user in the form of voice by TTS (Text to Speech) in the case of a robot (S206). The generated queries may be provided to a user in the form of not voice but text by a terminal in the case of other systems.

When TTS is used to ask queries, a user answers the queries by voice (S207). In this case, the system should include structure used to recognize voice. The user's answer may be 5-step answers, for example, affirmation, general affirmation, ordinary, general negation, and negation. The learning apparatus according to the present invention waits for the user's answer, and stores the rules in the confidence or non-confidence region of the rule storage device on the basis of the degree of confidence with respect to the user's answer (hereinafter, referred to as "user's answer-confidence") (S208). In this case, if the user's answer-confidence is high, that is, if the user's answer is affirmation or negation, the answer-confidence is high. If the user's answer is general affirmation or general negation, the answer-confidence is middle. If the user's answer is ordinary, the answer-confidence is lowest.

Accordingly, if the answer-confidence is high, the rules are stored in the confidence region of the rule storage device. If the answer-confidence is middle or less, the rules are stored in the non-confidence region together with confidence values (which may be 75%, 50%, or 25% depending on the number of non-confidence levels).

FIG. 3 is a view showing an example of a table that is used to translate events included in a rule according to the present invention into user queries.

The table shown in FIG. 3 includes an event predicate T110, an event function T120, an event value T130, and an event text T140. The event predicate T110 and the event function T120 mean the kind of a sensor that can be used in an environment, and the event value T130 means data sensed by the sensor. The event text T140 means a string that is translated in to a user query during the generation of the user query.

FIG. 4 is a view showing an example of a table that is used to translate services included in a rule according to the present invention into user queries.

The table shown in FIG. 4 includes a service predicate T210, a service state T220, a service value T230, and a service text T240. The service predicate T210 is a descriptor for the service that can be used in an environment, and the service state has one of two values ON and OFF representing whether a service is used or not. The service value indicates values of input factors required when a service is implemented.

The contents of the tables shown in FIGS. 3 and 4 may be changed depending on various services and events in the environment where the system is implemented. User queries are generated with reference to the contents of the tables shown in FIGS. 3 and 4.

FIG. 5 shows an example of user queries for a rule that is used in a learning apparatus and a learning method according to the present invention. The user queries shown in FIG. 5 are delivered to a user by TTS, and a user answers the user queries. Accordingly, rules can be newly arranged on the basis of the user's answers.

What is claimed is:

1. A learning apparatus of an intelligent system that automatically controls a system on the basis of information about events generated in an external environment or services input by a user, the learning apparatus comprising:
a rule management device determining whether rules extracted from event data or service data are the same as rules already stored in a rules disc storage, generating queries about the confidence of new rules and providing the queries to the user if the rules are new rules, and updating the rules on the basis of user's answers; and
the rules disc rule storage that stores the rules in a confidence region or a non-confidence region depending on the confidence of rules input by the user.

2. The learning apparatus according to claim 1, wherein the rule management device includes:
a translation table used to translate services and events, which are included in rules extracted from a learning engine, into strings;
a query generation module that generates user queries by using the translation table;
a speech module that delivers the user queries to a user by TTS (Text to Speech); and
a response recognition module that receives answers from the user.

3. The learning apparatus according to claim 1, further comprising:
a logging device that stores sensed event information or log information about service requests;
an event analyzing device that analyzes event or service information input from the logging device, classifies the event or service information into data to be learned, and preprocesses the data;
a learning engine that implements a learning algorithm by using the data preprocessed in the event analyzing device so as to search users' patterns included in the preprocessed data; and
a rule extracting device that converts the results searched by the learning engine into rule formats, and extracts rules.

4. The learning apparatus according to claim 3, wherein the event analyzing device includes:
a table that stores meta information about an event source or meta information about services implemented by a service terminal; and
a log binding module that searches service information related to event information and relates service information to event information.

5. The learning apparatus according to claim 1, further comprising:
a rule engine that processes logical conclusion and queries about the stored rules; and
a rule trigger that searches services corresponding to event or service information that is currently input from rules already stored, and provides corresponding services or related services to the user.

6. A learning method of an intelligent system that automatically controls a system on the basis of information about events generated in an external environment or services input by a user, the learning method comprising:
determining whether rules extracted from event data or service data are the same as rules already stored;
generating queries about the confidence of new rules and providing the queries to a user if the rules are the new rules;
updating the rules on the basis of user's answers; and
storing the rules in a confidence region or a non-confidence region depending on the confidence of rules input by the user.

7. The learning method according to claim 6, further comprising:
generating user queries by using a translation table, the translation table being used to translate services and events, which are included in rules extracted from a learning engine, into strings;
delivering the generated user queries to a user by TTS (Text to Speech); and
receiving answers from the user.

8. The learning method according to claim 6, further comprising:
storing sensed event information or log information about service requests;
analyzing event or service information input from the storing of the information, classifying the event or service information into data to be learned, and preprocessing the data; and
implementing a learning algorithm by using the preprocessed data so as to search users' patterns included in the preprocessed data.

9. The learning method according to claim 6, further comprising:
processing logical conclusion and queries about the stored rules; and
searching services corresponding to event or service information that is currently input from rules already stored, and providing corresponding services or related services to the user.

* * * * *